US009092668B2

(12) United States Patent
Statsenko et al.

(10) Patent No.: US 9,092,668 B2
(45) Date of Patent: Jul. 28, 2015

(54) IDENTIFYING PICTURE AREAS BASED ON GRADIENT IMAGE ANALYSIS

(75) Inventors: Konstantin Statsenko, Moscow (RU); Dmitry Deryagin, Moscow (RU)

(73) Assignee: ABBYY Development (RU)

( * ) Notice: Subject to any disclaimer, the term of this patent is extended or adjusted under 35 U.S.C. 154(b) by 158 days.

(21) Appl. No.: 12/838,430

(22) Filed: Jul. 16, 2010

(65) Prior Publication Data

US 2011/0013847 A1    Jan. 20, 2011

Related U.S. Application Data (60) Provisional application No. 61/226,704, filed on Jul. 18, 2009.

(51) Int. Cl.
  *G06K 9/34* (2006.01)
  *G06K 9/00* (2006.01)
  *G06K 9/46* (2006.01)

(52) U.S. Cl.
  CPC ............ *G06K 9/00456* (2013.01); *G06K 9/468* (2013.01); *G06K 9/4638* (2013.01); *G06K 2209/01* (2013.01)

(58) Field of Classification Search
  USPC .......... 382/173–176, 199, 216, 220–224, 237
  See application file for complete search history.

(56) References Cited

U.S. PATENT DOCUMENTS

| 5,465,304 | A | | 11/1995 | Cullen et al. |
| 5,546,474 | A | | 8/1996 | Zuniga |
| 5,613,016 | A | * | 3/1997 | Saitoh ........................... 382/174 |
| 5,854,853 | A | * | 12/1998 | Wang ............................ 382/176 |
| 5,867,593 | A | * | 2/1999 | Fukuda et al. ................ 382/176 |
| 5,884,296 | A | * | 3/1999 | Nakamura et al. ............... 706/20 |
| 6,014,450 | A | * | 1/2000 | Heilper et al. ................ 382/101 |
| 6,324,309 | B1 | | 11/2001 | Tokuyama et al. |
| 6,332,045 | B1 | | 12/2001 | Sawada et al. |
| 6,973,213 | B2 | | 12/2005 | Fan et al. |

(Continued)

FOREIGN PATENT DOCUMENTS

RU    2259041 C2 *  8/2005

OTHER PUBLICATIONS

Tuma Jan J—Engineering Mathematics Handbook—, ISBN 0-07-065529-4, 1997, pp. 304-312.*

(Continued)

*Primary Examiner* — Matthew Bella
*Assistant Examiner* — Weiwen Yang
(74) *Attorney, Agent, or Firm* — LeighAnn Weiland; Veronica Weinstein (57) ABSTRACT

In one embodiment, a method for identifying areas in a document image is provided. The method comprises generating binarized and gradient images based on the document image; and performing a classification operation to classify areas in the document image into one of a noise area and a picture area based on attributes computed on the binarized and gradient images.

22 Claims, 11 Drawing Sheets

(56) References Cited

U.S. PATENT DOCUMENTS

| | | | |
|---|---|---|---|
| 7,254,270 B2 | 8/2007 | Simske | |
| 7,302,098 B2 | 11/2007 | Tang et al. | |
| 7,391,917 B2 | 6/2008 | Ohta et al. | |
| 7,437,002 B2 | 10/2008 | Tanaka | |
| 7,813,554 B2 | 10/2010 | Wang et al. | |
| 2003/0095709 A1* | 5/2003 | Zhou | 382/190 |
| 2007/0171473 A1 | 7/2007 | Iwasaki | |
| 2007/0286499 A1* | 12/2007 | Freiburg et al. | 382/229 |
| 2008/0114564 A1* | 5/2008 | Ihara | 702/158 |
| 2009/0154810 A1* | 6/2009 | Enomoto et al. | 382/182 |
| 2010/0046842 A1* | 2/2010 | Conwell | 382/218 |
| 2010/0054595 A1* | 3/2010 | Demandolx et al. | 382/170 |
| 2010/0074523 A1* | 3/2010 | Ishiga | 382/170 |
| 2010/0111416 A1 | 5/2010 | Meiers | |

OTHER PUBLICATIONS

Dellaert, Frank "The Expectation Maximization Algorithm", Technical Report No. GIT-GVU-02-20, College of Computing, Georgia Institute of Technology,(Feb. 2002),1-7.

Wong, Kwan Y., et al., "Document Analysis System", IBM J. Research Development, vol. 26, No. 6,(Nov. 1982),647-656.

Zheng, Yefeng "Machine Printed Text and Handwriting Identification in Noisy Document Images", IEEE Transactions on Pattern Analysis and Machine Intelligence, vol. 26, No. 3,(Mar. 2004),337-353.

Russell, Stuart J., et al., "Artificial Intelligence: A Modern Approach", Second Edition; Pearson Education, Inc., Upper Saddle River; New Jersey,(2003),712-762.

* cited by examiner

IDENTIFYING PICTURE AREAS BASED ON GRADIENT IMAGE ANALYSIS

This application claims the benefit of priority to U.S. 61/226,704, filed on Jul. 18, 2009.

FIELD

Embodiments of the present invention relate generally to a method and system for Optical Character Recognition (OCR).

BACKGROUND

Document recognition typically involves a stage at which the structure of the document is analyzed. At this stage, various areas are identified in the document image, their sizes and positions are saved to memory, and their classes are detected based on their content, for e.g. text, picture, table, chart, or noise.

Thus, picture areas are detected in the document image by that part of the OCR software which is responsible for analysis and is therefore termed the analyzer.

Various solutions are available for distinguishing between text and non-text areas, but not for distinguishing between noise and picture areas. When dealing with magazine pages with complicated layouts, finding and identifying picture objects is of great practical importance. Magazine articles will often have text printed over photographs, which in turn, may have non-rectangular borders of various shapes.

SUMMARY

In one embodiment, a method for identifying areas in a document image is provided. The method comprises generating binarized and gradient images based on the document image; and performing a classification operation to classify areas in the document image into one of a noise area and a picture area based on attributes computed on the binarized and gradient images.

Other aspects of the inventions may be apparent from the written description below.

DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The method of the invention enables the classification of objects on an image being recognized based on information obtained from a grayscale or color version of the image. In a grayscale image, each pixel has a brightness from 0 (black) to 255 (white), and in a color image, the three parameters of the RGB (Red, Green, Blue) color model assume values from 0 to 255.

Figure 1:
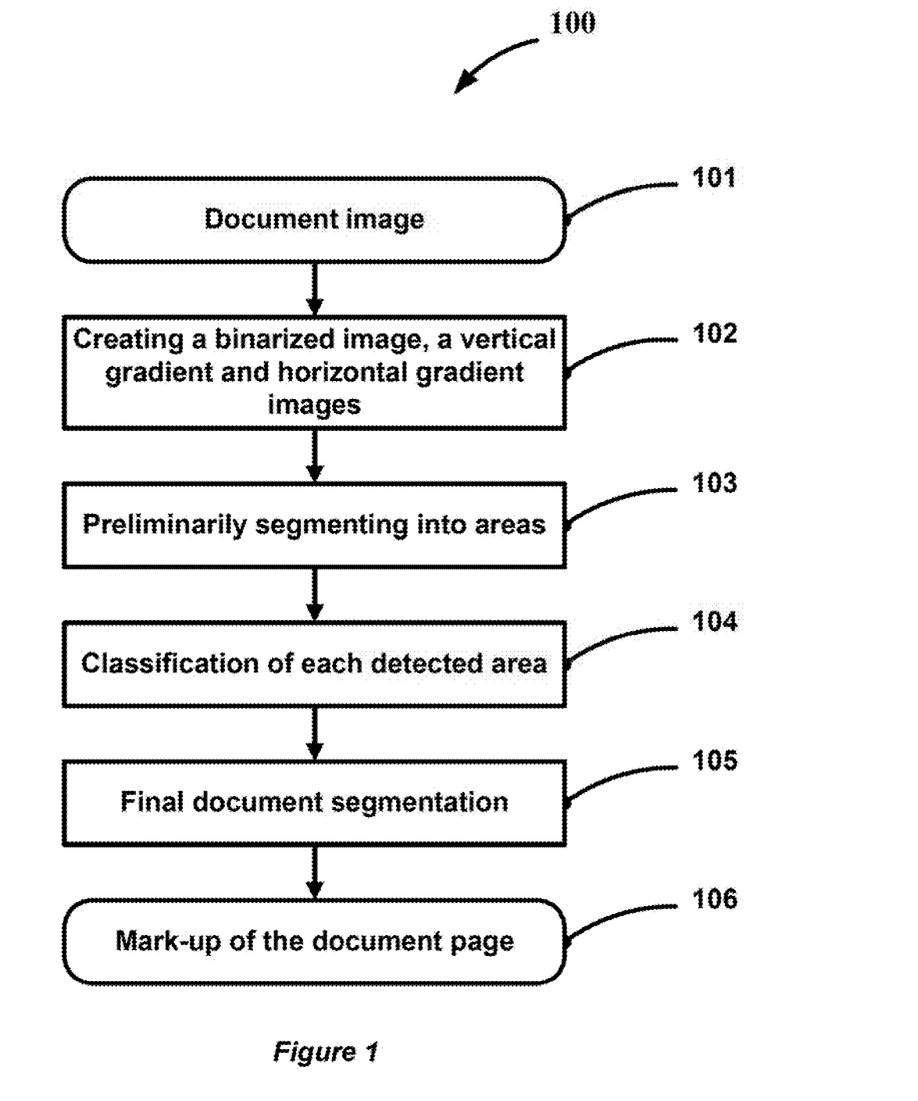
FIG. 1 shows a flow chart of a document analysis process.
Figure 5A:
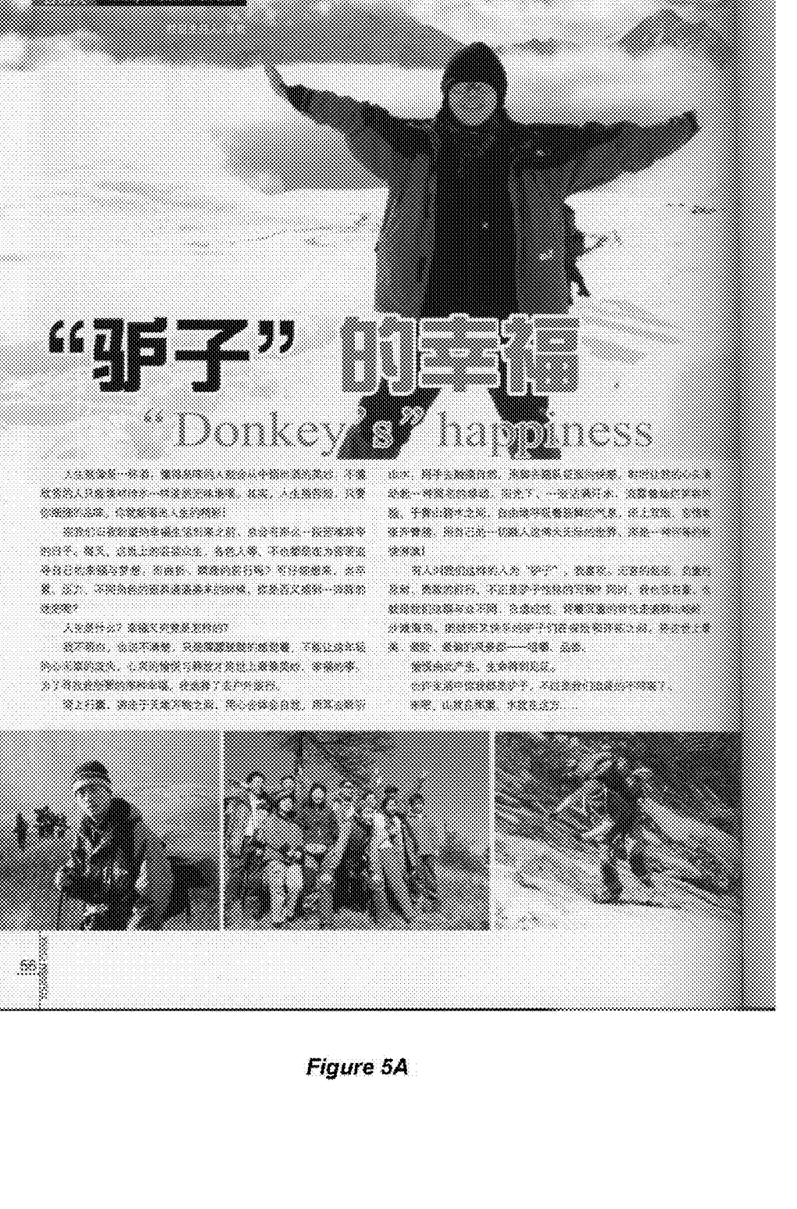
FIG. 5A shows an example of a source color image.
Figure 5B:
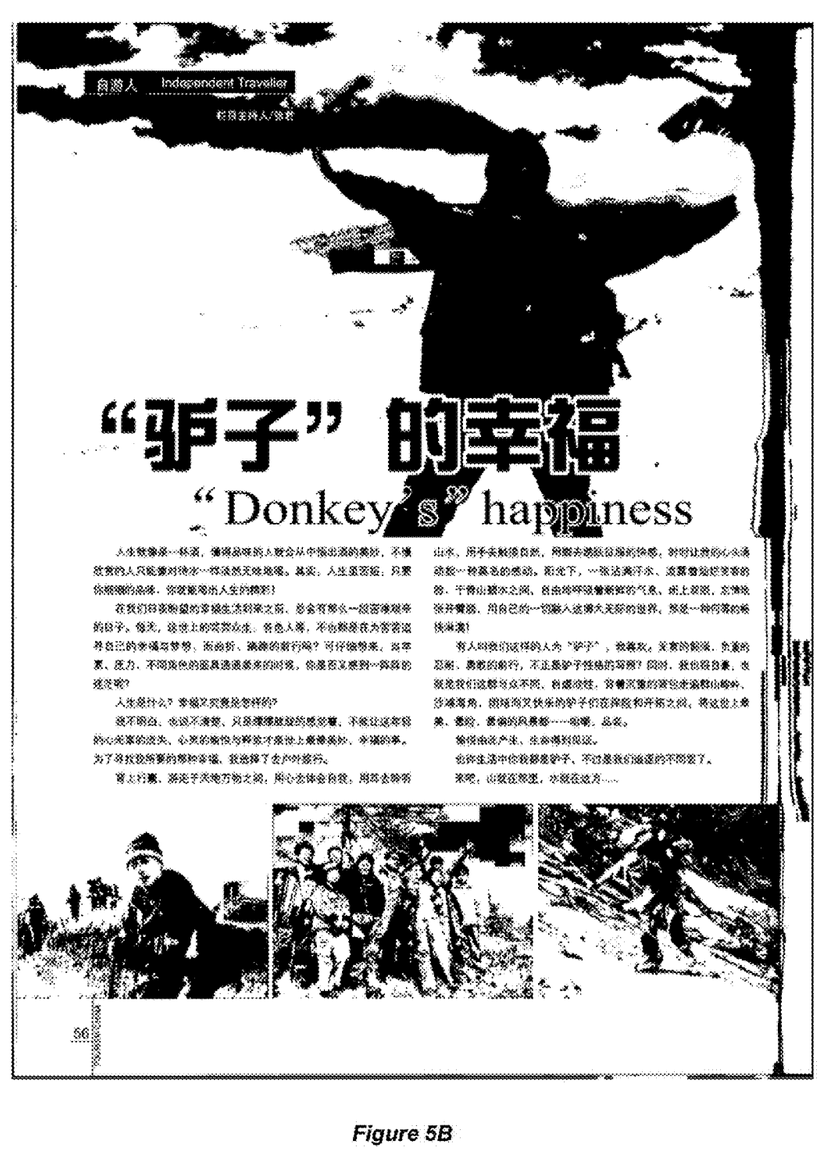
FIG. 5B shows an example of a binarized image.
Figure 5C:
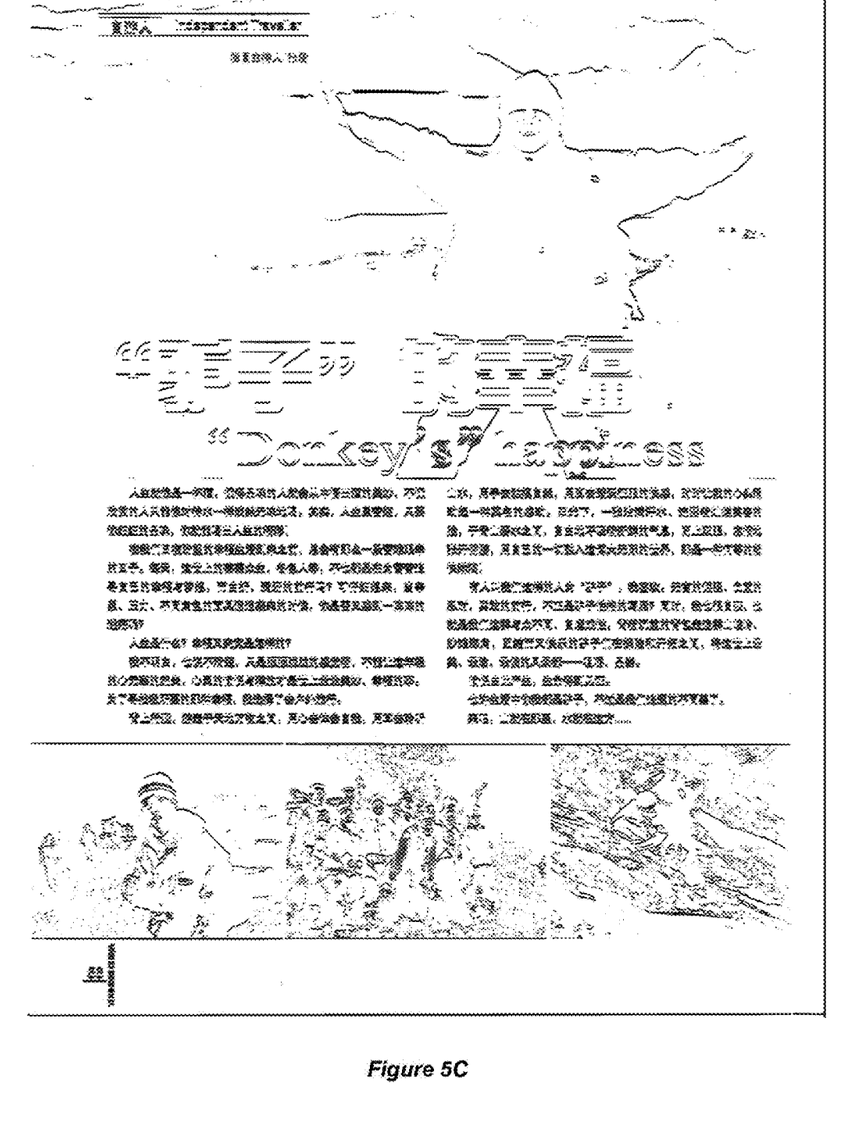
FIG. 5C shows an example of a vertical gradient image.
Figure 5D:
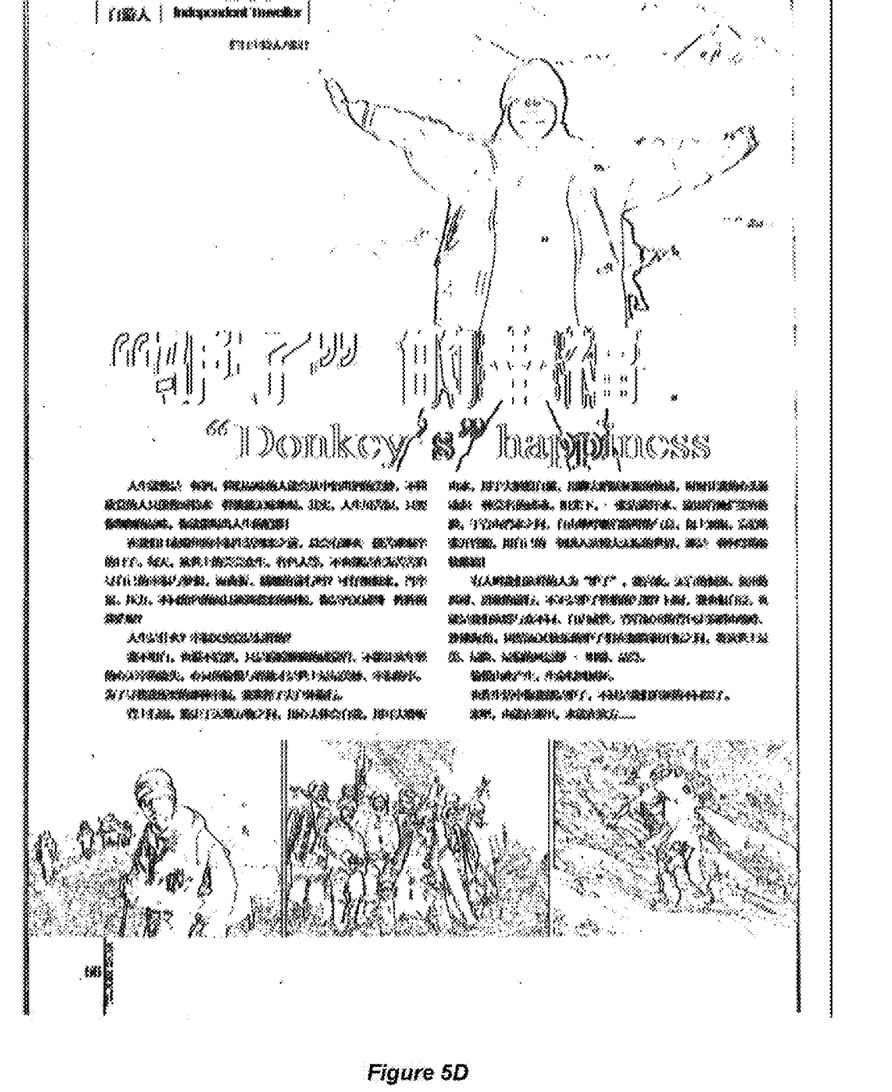
FIG. 5D shows an example of a horizontal gradient image.

The method of the invention comprises several stages, shown in the block diagram of FIG. 1. When a document image (101) is analyzed, a binarized image, a vertical gradient image, and a horizontal gradient image are created from it at step 102. FIG. 5A shows an example of a color magazine page which corresponds to the document image 101. The processing step 102 results in a binarized image (shown in FIG. 5B), vertical gradient image (shown in FIG. 5C), a horizontal gradient image (shown in FIG. 5D).

A binarized image is an image in which each pixel may be either black or white. The color of each pixel is determined based on a brightness threshold: pixels brighter than the threshold are deemed to be white and pixels darker than the threshold are deemed to be black. The threshold value is selected either heuristically or by using any known binarization method (for example the binarization method described in co-pending U.S. patent application Ser. No. 12/269,789).

A gradient image is a grayscale image in which the brightness of each pixel corresponds to the absolute value of the brightness gradient on the source image. A gradient image provides information about the contrast of the source image. The gradient at a certain point is defined as the function of the brightness of the neighboring pixels. To compute the gradient, in one embodiment, a 5×6 Sobel operator is used. The Sobel operator is a discrete differentiation operator that approximates the gradient of the image intensity function. In a gradient image, the darkest areas are those where the source image has the biggest jump in brightness.

FIG. 5A shows an example of a color magazine page, also its binarized (FIG. 5B), vertical gradient (FIG. 5C), horizontal gradient (FIG. 5D) and combined gradient (FIG. 5E) images are represented.

A horizontal or vertical gradient image is a grayscale image in which the brightness of each pixel corresponds to the absolute value of the horizontal or vertical component of the gradients of the initial grayscale image.

Next, at the step 103, the page is preliminarily segmented into areas which possess certain properties. The segmentation into areas may involve the use of the images obtained at the step 102. Next, the objects are classified (104), i.e. the class of each detected area is identified based on its various attributes which account for the typical features of the possible classes. As a rule, the system refers to various classifiers when detecting each new area. The classification process is described in greater detail later. Based on the data obtained at the steps 103 and 104, the system decides on the position, size, and classes of the detected areas (105). The result of the analysis is the mark-up of the document image (106). The mark-up is a set of identified and classified areas containing different classes of data: text, pictures, tables, noise, etc.

During the analysis process usually several classifiers are used, each responsible for a specific task. A classifier is an algorithm which quantitatively evaluates the set of attributes of an object to determine whether the object belongs to a certain class. The greater the numerical value returned by a classifier, the greater the probability that the analyzed object belongs to the corresponding class. Embodiments of the present invention discloses a classifier which performs the task of classifying picture areas that uses attributes computed on binarized and gradient images.

Areas are classified based on a set of attributes, which may include, for example, subsets of attributes used for classifying text areas, subsets of attributes that describe the distinguishing features of pictures, and other attributes. In one embodiment, distributions of various values may be used, such as the brightness values of individual pixels and the values of the gradients computed and averaged by applying various techniques. The major characteristics of said distributions are its average value, dispersion, asymmetry coefficient, and the coefficient of excess (i.e. a measure of the sharpness of the peak of a distribution of a random quantity).

The value that characterizes the asymmetry of a distribution can be obtained from the formula $$\gamma_1 = \frac{\mu_3}{\sigma^3},$$

where, $\mu_3$ is the third central moment of the distribution under consideration and $\sigma$ is its dispersion. The coefficient of excess may be calculated using the formula $$\gamma_2 = \frac{\mu_4}{\sigma^4} - 3,$$

where $\mu_4$ is the fourth central moment of a distribution under consideration.

Embodiments of the present invention use attributes that have been experimentally shown to produce good-quality classification. These attributes include:
1. The average lengths of black and white vertical and horizontal Run-Length Encoding (RLE) strokes computed on binarized images (a total of 4 attributes). An RLE stroke is a continuous sequence of black pixels. RLE encoding based on run lengths is an image compression method, usually used for bit-mapped graphics, which identifies sequences of data ("runs") in a file that are made up of identical elements; each sequence is then substituted with two symbols—the element and the number of its repetitions.
2. The average, dispersion, asymmetry, and excess of the distribution of the frequencies of occurrence of the values of the horizontal and vertical components of the gradient field of the grayscale image dm object (a total of 8 attributes).
3. The attribute equal to the average number of white holes among connected black components of the gradient image. A connected black component is a continuous black contour, white gaps in closed contours which more than threshold number of pixels are said white holes. This attribute is useful for distinguishing text from picture, because there are many holes relative to connected black components on text areas, whereas on picture areas there are few holes, by reason of most components are unclosed (see FIG. 5E top half).

The method of the invention uses the classifier to resolve ambiguities that may arise during classification of one of the areas that were detected during the preliminary segmentation (103). The preliminary segmentation may be performed by any means. It does not matter how these areas were detected, the areas may be labeled even manually.

Figure 2:
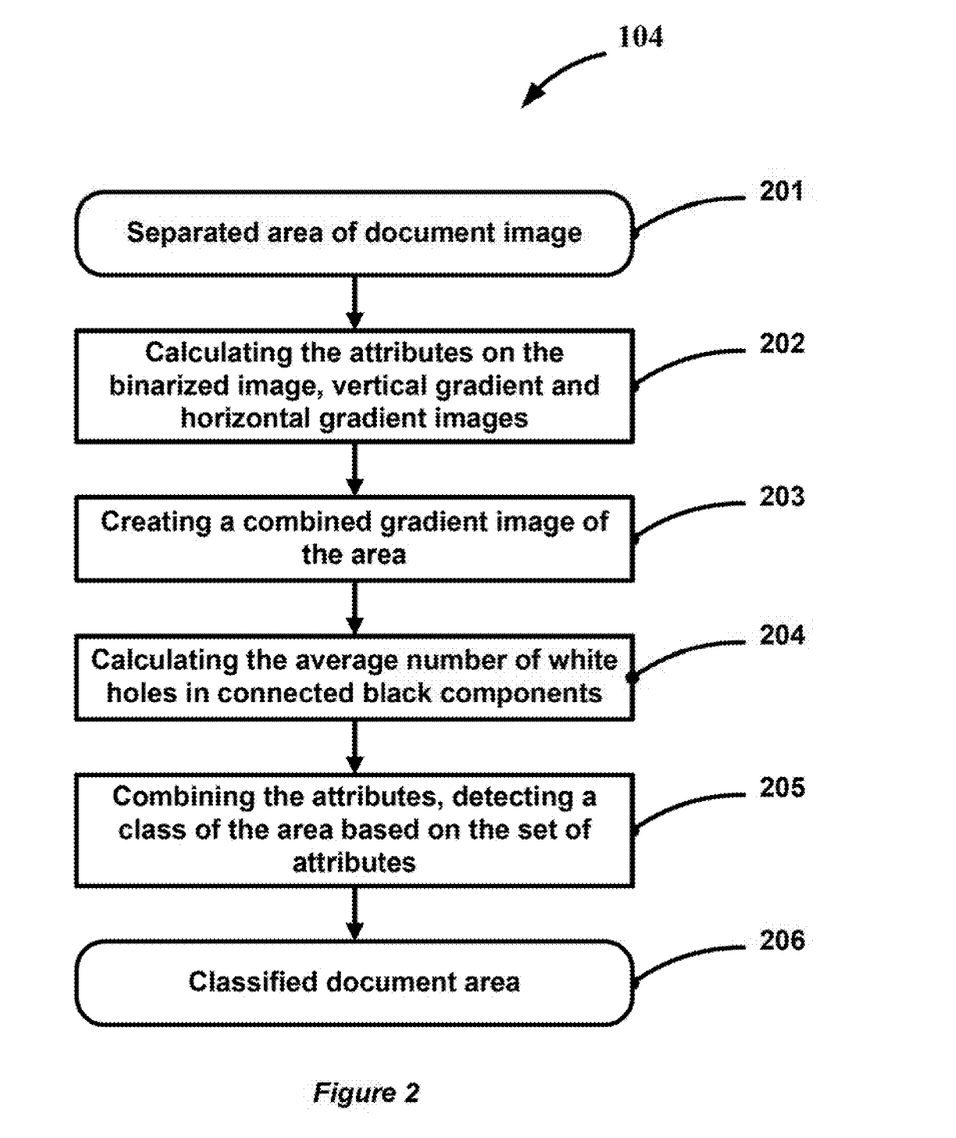
FIG. 2 shows a flow chart of a method for classifying the detected area.

Often the system needs to decide whether an area should be classified as one or the other of the two possible classes, e.g. answer the questions "Is it a picture or text?" or "Is it a picture or noise?" This may happen when the segmentation process produces two different hypotheses about the class of the area, of which the most probable hypothesis must be selected. To achieve this, the steps shown in FIG. 2 are performed.

In one embodiment, to identify the class of a separated area (201), that was found on the page, four attributes are computed on the binarized image (for example, FIG. 5B) (the average lengths of the black and white vertical and horizontal RLE-strokes), and four attributes are computed at the step 202 for each of the two gradient images (for example, FIGS. 5C and 5D) (the average value of the distribution of the frequencies of occurrence of the values of components of the gradient field, its dispersion, coefficient of asymmetry, and coefficient of excess). At 202, the images are used that were created at the stage 102. In general, this may be done at a different stage of analysis. In one embodiment, the binarized and gradient images of the document are obtained prior to accessing the classifier.

Figure 5E:
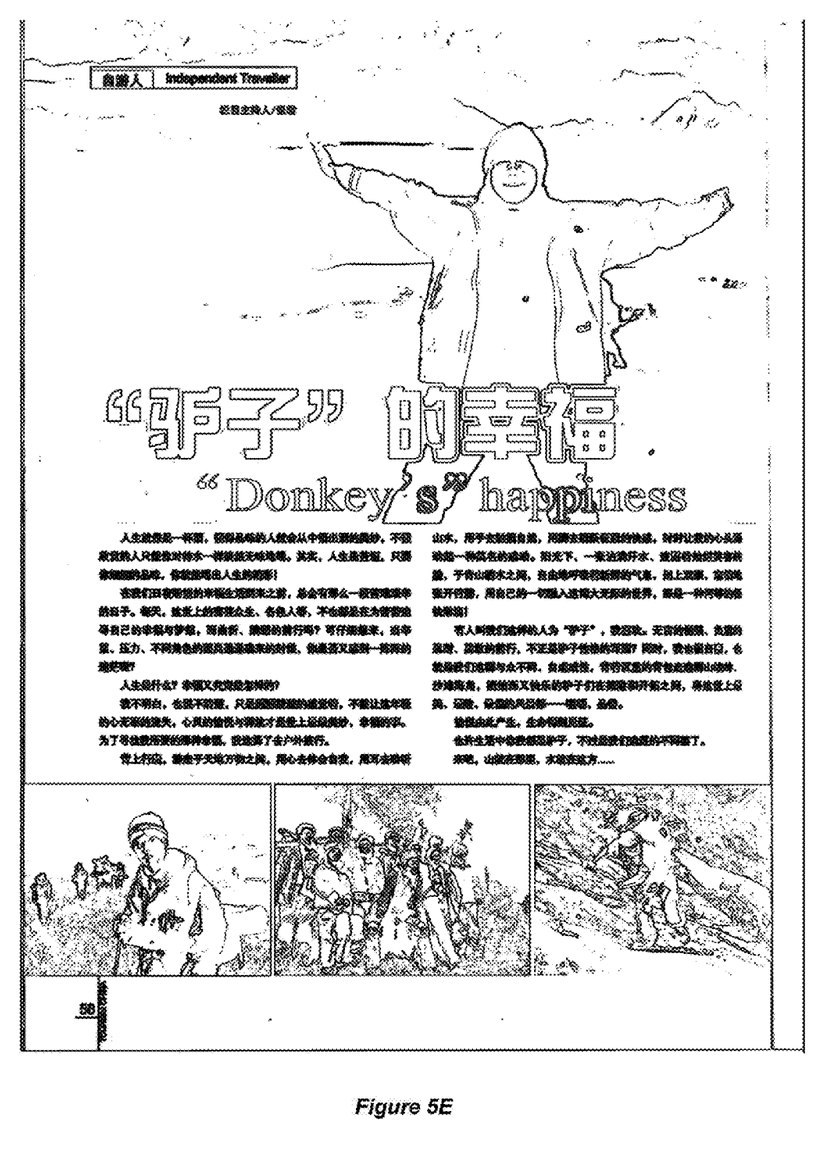
FIG. 5E shows an example of a combined gradient image

Next, based on the two gradient images, a combined gradient image of the examined area is created (203). The combined gradient image is an image of the real boundaries which is obtained by combining their horizontal and vertical parts. FIG. 5E shows an example of a combined gradient image of a page, based on the gradient images from FIGS. 5C and 5D. For the combined gradient image, at step 204, the final attribute is computed—the average number of white holes in the connected black components. To make the computation of this attribute easier, the combined gradient mage may be binarized first.

Next, all the computed attributes are combined (205). Based on this set of attributes, the classifier makes a decision on a class of the object.

Figure 3A:
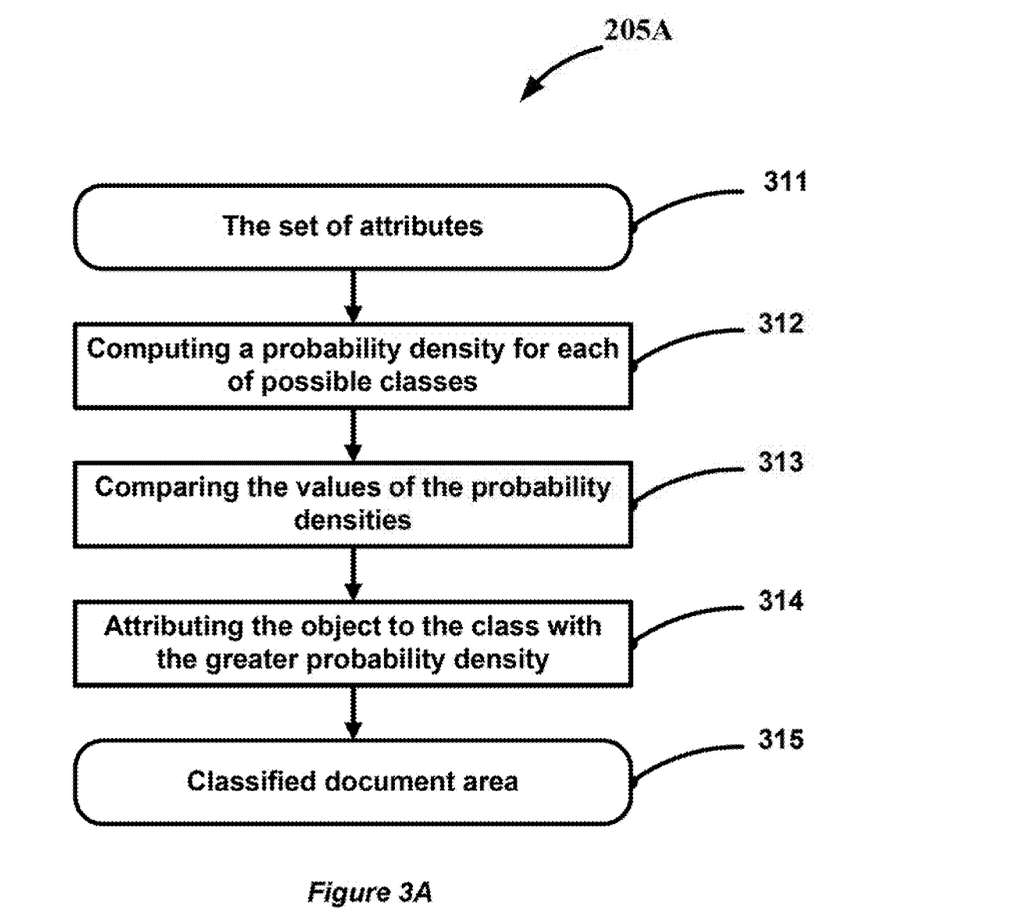
FIG. 3A shows a flow chart of an embodiment of the invention.
Figure 3B:
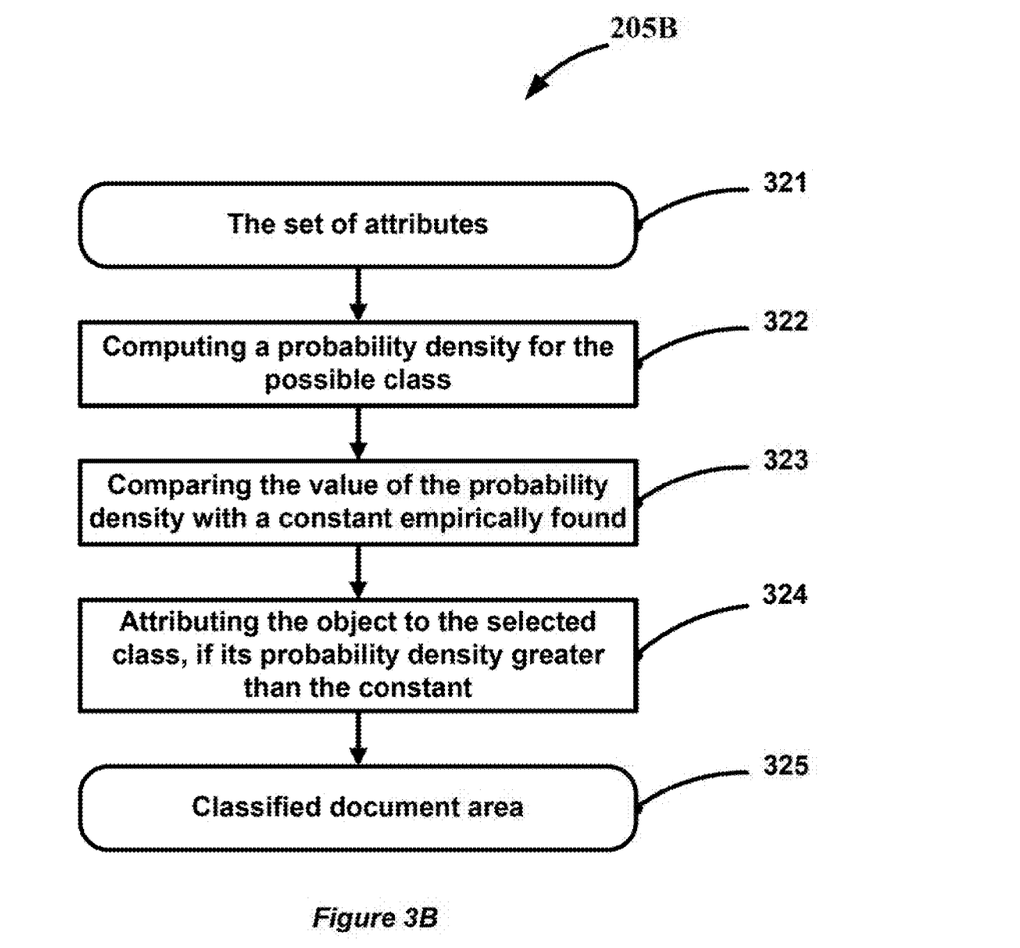
FIG. 3B shows a flow chart of another embodiment of the invention.
Figure 4:
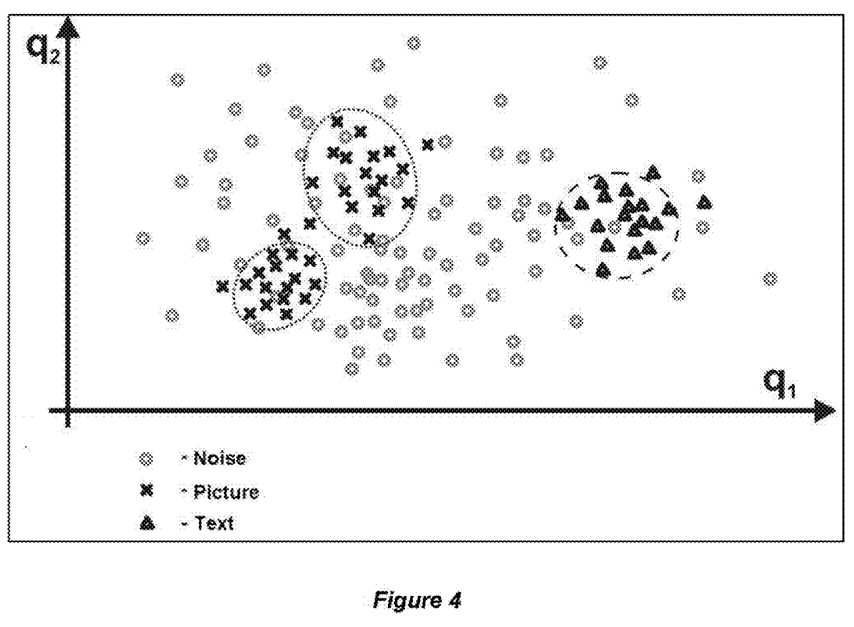
FIG. 4 shows an example of the allocation of various classes of objects in a two-dimensional space of attributes.

In one embodiment, to classify the object at the stage 205, one of the following methods may be selected:
1) In one embodiment (FIG. 3A), at step 205, the obtained set of attributes (311) is used to compute (312) two probability densities, for the first and second possible class respectively. These values are compared (313), and the object should be attributed (314) to the class with the greater probability density. Alternatively, the probability that the detected object belongs to the first class may be computed using the following formula:

$$\frac{\rho_1}{\rho_1 + \rho_2},$$

where $\rho_1$ is a probability density for the first possible class and $\rho_2$ is a probability density for the second possible class. This approach is usually used to resolve "picture or text?" ambiguities.
2) In another embodiment (FIG. 3B), at step 205, the set of attributes (321) is used to compute (322) the probability density for the selected class. In this case, the selected class should not be "noise," as one characteristic feature of noise is the very broad range of its attribute values, unlike pictures and text, whose attributes have a relatively narrow range (see, for example, FIG. 4). This is due to the diverse causes of noise and its many possible manifestations. Therefore, when the "picture or noise" question arises, the picture class should be selected, and the density of the probability that the object belongs to any other class, including noise, may be assumed to be a constant, the value of which is to be selected empirically.

FIG. 4 shows an example of object's allocation in two-dimensional attribute space, such as "text", "picture" and "noise". As visible from figure, "text" and "picture" forms clusters unlike "noise" that has much more range of possible attribute values.

Next, the computed probability density is compared (323) with this constant, and if it is greater than the constant, the object may be classified (324) as attributed to the selected class. This approach is more often used to answer the question "picture or noise?" or, more precisely, "is there a picture in the area detected as noise?" The latter question often arises when noise is detected on the edges of a scanned image. Often a picture may be positioned below or above the body text and there is some risk that the picture may fall within a noise area and become lost. For example, on FIG. 5A edges of the page can be marked so that the upper picture with the heading may fall within a noise area, or even all page area except main text area can be marked as noise. The described classifier is used, among other things, to avoid such situation for areas detected as noise on the edges of the page.

The embodiment of the invention that includes steps shown in FIG. 3B may be used not only to detect pictures, but also to answer the question "Is there text in the area detected as noise?" if the text class is presumed at the stage 322.

A heading of an article in FIG. 5A was writing over the picture. In such situation class "text", as well as "picture", can be selected as estimated class at step 322. In both cases the object would be classified as attributing to the selected class. In other words, in one case it was found by the classifier that in the area there is a text, in another case that there is a picture.

In still another embodiment of the invention, for complicated cases, different stages may be invoked successively for one and the same area for greater reliability: e.g. stages 312, 313, and 314 followed by stages 322, 323, and 324, or stages 322, 323, and 324 followed by stages 312, 313, and 314. If both sequences show that the object is a picture, then the object is identified as a picture.

In one embodiment of the invention, when computing the distribution of the frequencies of occurrence of the gradient values, the values may be averaged by the neighboring pixels, and also only those pixels may be included in the distribution whose values are greater than a certain threshold. This is done to cut off the noise component, which may otherwise dominate in the distribution. It has been experimentally shown that usually about 80% of the surface of an average image contains small gradients with a corresponding sharp maximum in the distribution, which renders all other features inconspicuous.

Figure 6:
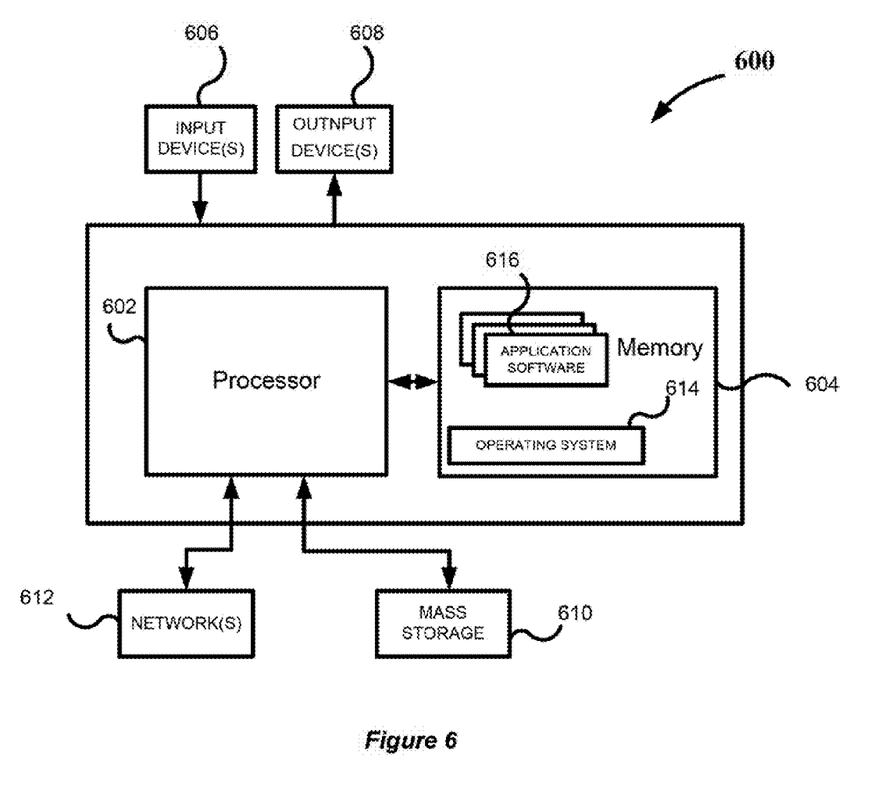
FIG. 6 shows a block diagram of a system for identifying picture areas in accordance with an example embodiment.

FIG. 6 of the drawings shows an example of a system 600. Depending on the use of the system 600, it may be a system for identifying picture areas, optionally including OCR capabilities. The system 600 may be operable to implement the method of FIGS. 1 and 2. The system 600 may include at least one processor 602 coupled to a memory 604. The processor 602 may represent one or more processors (e.g., microprocessors), and the memory 604 may represent random access memory (RAM) devices comprising a main storage of the system 600, as well as any supplemental levels of memory e.g., cache memories, non-volatile or back-up memories (e.g. programmable or flash memories), read-only memories, etc. In addition, the memory 604 may be considered to include memory storage physically located elsewhere in the system 600, e.g. any cache memory in the processor 602 as well as any storage capacity used as a virtual memory, e.g., as stored on a mass storage device 610.

The system 600 also typically receives a number of inputs and outputs for communicating information externally. For interface with a user or operator, the system 600 may include one or more user input devices 606 (e.g., a keyboard, a mouse, imaging device, etc.) and one or more output devices 608 (e.g., a Liquid Crystal Display (LCD) panel, a sound playback device (speaker, etc)).

For additional storage, the system 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 600 may include an interface with one or more networks 612 (e.g., a local area network (LAN), a wide area network (WAN), a wireless network, and/or the Internet among others) to permit the communication of information with other computers coupled to the networks. It should be appreciated that the system 600 typically includes suitable analog and/or digital interfaces between the processor 602 and each of the components 604, 606, 608, and 612 as is well known in the art.

The system 600 operates under the control of an operating system 614, and executes various computer software applications, components, programs, objects, modules, etc. to implement the techniques described above. Moreover, various applications, components, programs, objects, etc., collectively indicated by reference 616 in FIG. 6, may also execute on one or more processors in another computer coupled to the system 600 via a network 612, e.g. in a distributed computing environment, whereby the processing required to implement the functions of a computer program may be allocated to multiple computers over a network. The application software 616 may include a set of instructions which, when executed by the processor 602, causes the system 600 to implement the method of the invention.

The invention claimed is:

1. A method for identifying areas in a document image, the method comprising:
    generating a binarized document image based on the document image;
    generating gradient images based on the document image, the gradient images comprising:
        a first gradient image based on a horizontal component of a gradient of the document image,
        a second gradient image based on a vertical component of the gradient of the document image, and
        a third gradient image being a combination of said first gradient image and said second gradient image,
    preliminary segmenting the binarized document image into areas; and
    classifying, prior to a final segmentation of the document image, the preliminary segmented areas in the document image into classes based on attributes computed from the binarized document image, and the first, second and third gradient images, wherein each of the document classes is associated with a picture area, a text area, or a noise area, wherein the attributes comprise an average number of white holes in closed black contours on the third gradient image, wherein the white holes are white gaps with more than a threshold number of pixels that represent low contrast in brightness on the document image, and wherein the closed black contours represent high contrast in brightness on the document image.

2. The method of claim 1, wherein the classifying is performed through the use of a plurality of classifiers.

3. The method of claim 1, wherein the attributes comprise at least part of:
   an average length of black vertical run-length encoding (RLE) strokes computed from the binarized image;
   an average length of white vertical RLE strokes computed from the binarized image;
   an average length of black horizontal RLE strokes computed from the binarized image; and
   an average length of white horizontal RLE strokes computed from the binarized image.

4. The method of claim 1, wherein the attributes comprise an average value, a value related to dispersion, a value related to a asymmetry coefficient, and a value related to a coefficient of excess computed on a horizontal gradient image and a vertical gradient image.

5. The method of claim 1, wherein the classifying comprises combining the attributes and detecting the class based on the combined attributes.

6. The method of claim 5, wherein detecting the class comprises:
   computing a probability density for each possible class,
   comparing the values of the probability densities, and
   attributing the area to the class associated with the greatest probability density.

7. The method of claim 5, wherein detecting the class for each area comprises:
   computing a value associated with a probability density for each possible class for the respective area,
   comparing the value associated with the probability density with an empirically determined constant, and
   attributing the respective area to a class when the value associated with the probability density for the particular class is greater than the empirically determined constant.

8. The method of claim 1, wherein the third gradient image is calculated for at least a separate area of the document image prior to the final segmentation.

9. The method of claim 1, wherein the first, second, and third gradient images each comprise a grayscale image in which a brightness of each pixel corresponds to an absolute value of the respective or both horizontal or vertical component of the gradients of an initial grayscale image derived from the document image.

10. A document analysis system comprising:
    a processor; and
    a memory coupled to the processor, the memory storing instructions to perform a document analysis method for identifying areas in a document image, the method comprising:
       generating a binarized document image based on the document image;
       generating gradient images based on the document image, wherein the gradient images comprise:
          a first gradient image based on a horizontal component of a gradient of the document image,
          a second gradient image based on a vertical component of the gradient of the document image, and
          a third gradient image being a combination of said first gradient image and said second gradient image;
       preliminary segmenting the binarized document image into areas; and
       classifying, prior to a final segmentation of the document image, the preliminary segmented areas in the document image into classes based on attributes computed from the binarized document image, and the first, second, and third gradient images, wherein each of the document class is associated with a picture area, a text area or a noise area, wherein the attributes comprise an average number of white holes in closed black contours on the third gradient image, and wherein the white holes are white gaps with more than a threshold number of pixels that represent low contrast in brightness on the document image, and the closed black contours represent high contrast in brightness on the document image.

11. The document analysis system of claim 10, wherein the classifying includes the use of a plurality of classifiers.

12. The document analysis system of claim 10, wherein the attributes comprise:
    an average length of black vertical run-length encoding (RLE) strokes computed from the binarized image;
    an average length of white vertical RLE strokes computed from the binarized image; an average length of black horizontal RLE strokes computed from the binarized image; and
    an average length of white horizontal RLE strokes computed from the binarized image.

13. The document analysis system of claim 10, wherein the attributes comprising an average value, a value related to dispersion, a value related to a asymmetry coefficient, and a value related to a coefficient of excess computed on the horizontal gradient image and vertical gradient image.

14. The document analysis system of claim 10, wherein the third gradient image is calculated for at least a separate area of the document image prior to the final segmentation.

15. The document analysis system of claim 10, wherein the first, second, and third gradient images each comprise a grayscale image in which a brightness of each pixel corresponds to an absolute value of the respective or both horizontal or vertical component of the gradients of an initial grayscale image derived from the document image.

16. A computer-readable non-transitory medium having stored thereon a sequence of instructions which when executed by a processing system cause the system to perform a method for identifying areas in a document image, the method comprising:
    generating a binarized document image based on the document image;
    generating gradient images based on the document image, wherein the gradient images comprise:
       a first gradient image based on a horizontal component of a gradient of the document image,
       a second gradient image based on a vertical component of the gradient of the document image, and
       a third gradient image being a combination of said first gradient image and said second gradient image;
    preliminary segmenting the binarized document image into areas, and
    classifying, prior to a final segmentation of the document image, the preliminary segmented areas in the document image into classes based on attributes computed from the binarized document image, and the first, second and third gradient images, wherein each of the document class is associated with a picture area, a text area or a noise area, wherein the attributes comprise an average number of white holes in closed black contours on the third gradient image, wherein the white holes are white gaps with more than a threshold number of pixels that represent low contrast in brightness on the document image, and wherein the closed black contours represent high contrast in brightness on the document image.

17. The computer-readable non-transitory medium of claim 16, wherein the classification operation uses a plurality of classifiers.

18. The computer-readable non-transitory medium of claim 16, wherein the attributes comprise an average length of black and white vertical and horizontal Run-Length Encoding (RLE) strokes computed on the binarized image.

19. The computer-readable non-transitory medium of claim 16, wherein the attributes are characterized in terms of average value, dispersion, asymmetry coefficient, and a coefficient of excess computed on the horizontal and vertical gradient images.

20. The method of claim 1, wherein a gradient image further comprises an image generated such that a pixel of said image is a function of a brightness of a neighboring pixel.

21. The computer-readable non-transitory medium of claim 16, wherein the third gradient image is calculated for at least a separate area of the document image prior to the final segmentation.

22. The computer-readable non-transitory medium of claim 16, wherein the first, second, and third gradient images each comprises a grayscale image in which a brightness of each pixel corresponds to an absolute value of the respective or both horizontal or vertical component of the gradients of an initial grayscale image derived from the document image.

\* \* \* \* \*